(12) United States Patent
Kim et al.

(10) Patent No.: US 10,513,080 B2
(45) Date of Patent: Dec. 24, 2019

(54) METHOD FOR THE FREE FORM FABRICATION OF ARTICLES OUT OF ELECTRICALLY CONDUCTIVE FILAMENTS USING LOCALIZED HEATING

(71) Applicant: U.S.A. as represented by the Administrator of the National Aeronautics and Space Administration, Washington, DC (US)

(72) Inventors: Jae-Woo Kim, Newport News, VA (US); Godfrey Sauti, Hampton, VA (US); John M. Gardner, Newport News, VA (US); Emilie J. Siochi, Newport News, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 171 days.

(21) Appl. No.: 15/345,064

(22) Filed: Nov. 7, 2016

(65) Prior Publication Data

US 2017/0129170 A1    May 11, 2017

Related U.S. Application Data

(60) Provisional application No. 62/251,969, filed on Nov. 6, 2015.

(51) Int. Cl.
*B29C 67/00* (2017.01)
*B33Y 10/00* (2015.01)
(Continued)

(52) U.S. Cl.
CPC ........ *B29C 67/0055* (2013.01); *B29C 64/106* (2017.08); *B33Y 10/00* (2014.12);
(Continued)

(58) Field of Classification Search
CPC ........ B29C 35/0272; B29C 2049/4874; B29C 65/348; B29C 65/3488; B29C 65/4855;
(Continued)

(56) References Cited

U.S. PATENT DOCUMENTS 2,356,641 A    8/1944   Gregory
2,544,673 A    3/1951   Bernard
(Continued)

OTHER PUBLICATIONS

Iijima, Sumio, "Helical Microtubules of Graphitic Carbon", Letter to Nature, Nov. 7, 1991, pp. 56-58, vol. 354.
(Continued)

*Primary Examiner* — Stella K Yi
(74) *Attorney, Agent, or Firm* — Jennifer L. Riley; Robin W. Edwards

(57) ABSTRACT

A method of fabricating composite articles includes supplying electrical current to an electrically conductive filament. The electrically conductive filament may include a first material that is electrically conductive and a polymer second material. The polymer second material comprises at least one of a thermoplastic polymer and a partially cured thermosetting polymer. The heated filament is deposited according to a predefined pattern in successive layers to adhere the polymer material of the layers together and build up a three dimensional article. The article includes strands of the first material embedded in a substantially continuous polymer matrix of the second material.

19 Claims, 14 Drawing Sheets
(4 of 14 Drawing Sheet(s) Filed in Color)

(51) Int. Cl.
  B29C 64/106 (2017.01)
  B33Y 50/02 (2015.01)
  B29K 105/16 (2006.01)
  B29C 64/386 (2017.01)
(52) U.S. Cl.
  CPC ........ B29C 64/386 (2017.08); B29K 2105/16 (2013.01); B29K 2995/0005 (2013.01); B33Y 50/02 (2014.12)
(58) Field of Classification Search
  CPC ............ B29C 70/882; B29C 2045/169; B29C 64/165; B29C 64/20; B29K 2995/0005; B33Y 10/00
  See application file for complete search history.

(56) References Cited

U.S. PATENT DOCUMENTS

| | | | |
|---|---|---|---|
| 2,821,253 | A | 1/1958 | Heffelfinger |
| 2,871,622 | A | 2/1959 | Edward et al. |
| 3,763,561 | A | 10/1973 | Scharfenberger |
| 4,169,398 | A | 10/1979 | Wadsworth et al. |
| 4,248,114 | A | 2/1981 | Alexander et al. |
| 4,557,049 | A | 12/1985 | Cribbs et al. |
| 4,984,727 | A | 1/1991 | Jimenez |
| 5,044,235 | A | 9/1991 | Lehner |
| 5,121,329 | A | 6/1992 | Crump |
| 5,176,028 | A | 1/1993 | Humphrey |
| 5,448,186 | A | 9/1995 | Kawata |
| 5,500,505 | A | 3/1996 | Jones |
| 5,873,291 | A | 2/1999 | Sand |
| 6,282,950 | B1 | 9/2001 | Taylor, Jr. |
| 6,518,330 | B2 | 2/2003 | White et al. |
| 6,735,870 | B2 | 5/2004 | Sand |
| 6,934,600 | B2 | 8/2005 | Jang |
| 7,137,761 | B2 | 11/2006 | Hara et al. |
| 7,297,304 | B2 | 11/2007 | Swanson et al. |
| 7,799,849 | B2 | 9/2010 | Raravikar et al. |
| 8,221,669 | B2 | 7/2012 | Batchelder |
| 8,347,723 | B2 | 1/2013 | Questo et al. |
| 8,452,073 | B2 | 5/2013 | Taminger et al. |
| 2009/0294022 | A1 | 12/2009 | Hayes et al. |
| 2012/0036977 | A1 | 2/2012 | Vaniglia |
| 2013/0233471 | A1 | 9/2013 | Kappesser et al. |
| 2013/0255084 | A1 | 10/2013 | Hasegawa et al. |
| 2014/0061974 | A1 | 3/2014 | Tyler |
| 2014/0249773 | A1 | 9/2014 | Beuth, Jr. |
| 2014/0268604 | A1 | 9/2014 | Wicker et al. |
| 2014/0291886 | A1* | 10/2014 | Mark ................... B29C 64/118 264/163 |
| 2015/0044383 | A1 | 2/2015 | Kim |
| 2015/0108677 | A1 | 4/2015 | Mark et al. |
| 2018/0207934 | A1* | 7/2018 | Yakushenko ........ B41J 2/14201 |

OTHER PUBLICATIONS

Dresselhaus, Mildred S. et al., Carbon Nanotubes Synthesis, Structures, Properties and Applications (T. W. Ebbesen, Ed. 1991). Chapter 2, Relation of Carbon Nanotubes to Other Carbon Materials, Graphite p. 14: Chapter 3, Nanotube Growth and Characterization, p. 29 and Chapter 6, Electronic Properties and Defects, p. 118.

Koratkar, Nikhil A. et al., "Multifunctional Structural Reinforcement Featuring Carbon Nanotube Films", Compos. Sci. and Technol. (2003) pp. 1525-1531, vol. 63.

Atkinson, Ken R. et al., "Multifunctional Carbon Nanotube Yarns and Transparent Sheets: Fabrication, Properties, and Applications", Physica B (2007) pp. 339-343, vol. 394.

Qui, Jingjing et al., "Carbon Nanotube Integrated Multifunctional Multiscale Composites", Nanotechnology (2007) pp. 1-11, vol. 18, 275708.

Kaemogebm M. et al., Multifunctional Carbon Nanotube Networks for Fuel Cells, Appl. Phys. Lett. (2008) pp. 094103-1-094103-3, vol. 92, 094103.

Lee, Woo II et al., Microwave Curing of Composites, J. Comps. Mater (1984) 387-409, vol. 18, Technomic Publishing Co.

Dresselhaus, M. S. et al., "Physics of Carbon Nanotubes", (1995) Carbon, pp. 863-891, vol. 33, No. 7.

Park, Cheol et al., "Dispersion of Single Wall Carbon Nanotubes by in Situ Polymerization Under Sonication", Chem. Phys. Lett. (2002) pp. 303-308, vol. 364.

Thostenson, E. T. et al., "Processing-structure-multi-functional Property Relationship in Carbon Nanotube/epoxy Composites", (2006) Carbon, pp. 3022-3029 vol. 44.

Ma, Peng-Cheng et al., "Dispersion and Functionalization of Carbon Nanotubes for Polymer-based Nanocomposites: A Review", Composites: Part A (2010) pp. 1345-1367, vol. 41.

De Volder, Michael F. L. et al. "Carbon Nanotubes: Present and Future Commerical Applications", Science (2013) pp. 535-539, vol. 339.

Gurau, Michael, "Part 2: The world's First Commercial All-CNT Sheets, Tape and Yarns", archived at http://www.nanocomptech.com/blog/need-to-know-part-2-sheets-tape-yarn, accessed Apr. 17 2016.

Qunfeng, Cheng et al., "High mechanical performance composite conductor: multi-walled carbon nartotube sheet/bismaleimide nanocomposites", Adv. Funct. Mater. (2009) pp. 3219-3225, vol. 19.

Qunfeng, Cheng et al., "Functionalized Carbon-Nanotube Sheet/Bismaleimide Nanocomposites: Mechanical and Electrical Performance Beyond Carbon-Fiber Composites", Small (2010) pp. 763-767, vol. 6.

Kim, Jae-Woo et al., "Polyaniline/carbon Nanotube Sheet Nanocomposites: Fabrication and Characterization". ACS Appl. Mater. Interfaces (2013) pp. 8597-8606, vol. 5.

Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 18832-18843, vol. 6.

Downs, Rebekah et al., "Strain-Induced Alignment Mechanisms of Carbon Nanotube Networks", Adv. Eng. Mater. (2015) pp. 349-358, vol. 17.

Harvey, Stefanie E., "Carbon as Conductor: A Pragmatic Review", Proceedings of the 61st IWCS Conference (2013) pp. 558-562.

Behabtu, Natnael et al., "Strong, Light, Multifunctional Fibers of Carbon Nanotubes with Ultrahigh Conductivty", Science (2013) pp. 182-186, vol. 339.

Bak, David, "Rapid Prototyping or Rapid Production? 3D Printing Processes Move Industry Towards the Latter", Assembly Automation (2003) pp. 340-345, vol. 23.

Jones, Rhys. et al., "RepRap—the Replicating Rapid Prototype", Robotica (2011) pp. 177-191, vol. 29.

Espalin, D. et al., "3D Printing Multifunctionality: Structures with Electronics", Int. J. Adv. Manuf. Technol. (2014) pp. 963-978, vol. 72.

Tymrak, B. M. et al., "Mechanical Properties of Components Fabricated with Open-source 3-D Printers Under Realistic Environmental Conditions", Materials & Design (2014) pp. 242-246, vol. 58.

Garcia-Tunon, E. at el., "Printing in Three Dimensions with Graphene", Adv. Mater. (2015) pp. 1688-1693, vol. 27.

Kim, J. H. et el, 3D Printing of Reduced Graphene Oxide Nanowires, Adv. Mater. (2015) 157-161, vol. 27.

Nikzad, M. at al, "Thermo-mechanical Properties of a Highly Filled Polymeric Composites for Fused Deposition Modeling", Materials & Design (2011) pp. 3448-3456, vol. 32.

Walker, Brett S et al., "Reactive Silver Inks for Patterning High-conductivity Features at Mild Temperatures". J. Am. Chem. Soc. (2012) pp. 1419-1421, vol. 134.

Campbell, Thomas A., et al., "The Next Wave: 4D Printing Programming the Material World", Brent Scowcroft Center on International Security Report, Atlantic Council (2014).

Meng, Fancheng et al., "Electro-Induced Mechanical and Thermal Responses of Carbon Nanotube Fibers", Adv. Mater. (2014) pp. 2480-2485, vol. 26.

(56) References Cited

OTHER PUBLICATIONS

Namiki, M. et al., "3D Printing of Continuous Fiber Reinforced Plastic", SAMPE Conf. Proc., (2014) pp. 59-4328.
Dresselhaus, M. S., Dresselhaus, G. and Saito, R., Pergamon "Physics of Carbon Nanotubes," Carbon, vol. 33, No. 7, pp. 883-891, (1995).
Hoogenboom, R. et al., "Microwave-Assisted Polymer Synthesis: Recent Developments in a Rapidly Expanding Field of Research", Macromol. Rapid Commun., (2007) pp. 368-386, vol. 28.
Kumar, P. K. et al., "Development of infrared rRadiation Curing System for Fiber Reinforced Polymer Composites: An Experimental Investigation", Indian J. Eng. Mater. Sci. (2011) pp. 24-30, vol. 18.
Levy, A. et al., "Ultrasonic Welding of Thermoplastic Composites: a Numerical Analysis at the Mesoscopic Scale Relating Processing Parameters, Flow of Polymer and Quality of Adhesion", Int. J. Mater. Form. (2014) pp. 39-51, vol. 7.
Bayerl, T. et al., "The Heating of Polymer Composites by Electromagnetic Induction—A review", Composites, Part A, pp. 27-40 (2014), vol. 57.
Kim, Jae-Woo et al., "Toward High Performance Thermoset/Carbon Nanotube Sheet Nanocomposites via Resistive Heating Assisted Infiltration and Cure", ACS Appl. Mater. Interfaces (2014) pp. 8832-18843, vol. 6.
Soylemez, Emrecan et al., "Controlling Melt Pool Dimensions Over a Wide Range of Material Deposition Rates in Electron Beam Additive Manufacturing", Solid Freeform Fabrication Conference (2010) pp. 571-582.
Vasinonta, Aditad et al., "Process Maps for predicting residual stress andmelt pool size in the laser-based fabrication of thin-walled structures," J. Manuf., Sci. Eng (2006) pp. 101-109, vol. 129(1).
Beuth, J. et al., "The Role of process variables in laser-based direct metal solid freeform fabrication", N. JOM (2001) pp. 36-39, vol. 53.
Stiltner, Justin L. et al., "A Method for Creating Actuated Joints via Fiber Embedding in a Polyjet 3D Printing Process", 22nd Annual International Solid Freeform Fabrication Symposium, 2011.
Ge, Qi et al., "Active materials by four-dimension printing,"Applied Physics Letters (2013) pp. 131901, vol. 103.
Wool, Richard P., "Self-healing Materials: a Review", Soft Matter, 2008 pp. 400-418, vol. 4.
Liu, Ying et al., "Self-folding of Polymer Sheets Using Local Light Absorpotion", Soft Matter Feb. 14, 2012, pp. 1764-1769, vol. 8, No. 6.
Seufzer, Wiiliam J., "Additive Manufacturing Modeling And Simulation", NASA/TM—2014—218245, Apr. 2014.
Beuth, Jack and Klingbeil, "The Role of Process Variables in Laser-Based Direct Metal Solid Freeform Fabrication", JOM, Sep. 2001, pp. 36-39.

* cited by examiner

METHOD FOR THE FREE FORM FABRICATION OF ARTICLES OUT OF ELECTRICALLY CONDUCTIVE FILAMENTS USING LOCALIZED HEATING

CROSS-REFERENCE TO RELATED PATENT APPLICATION

This patent application claims the benefit of and priority to U.S. Provisional Patent Application No. 62/251,969, filed on Nov. 6, 2015 and titled "METHOD FOR THE FREE FORM FABRICATION OF ARTICLES OUT OF ELECTRICALLY CONDUCTIVE FILAMENTS USING LOCALIZED HEATING," the entire contents of which is hereby incorporated by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Multifunctional composites such as mechanically reinforced, electrically and thermally conductive parts are of interest in a range of areas including aerospace, automotive, high performance sporting goods and other applications.

BRIEF SUMMARY OF THE INVENTION

The present disclosure generally relates to the use of electrically conductive filaments, especially polymer coated carbon nanotube yarn filaments, for producing additively manufactured items and, more particularly, to an improved apparatus and process for fabricating components (3D printing) from electrically conductive filaments that are heated via resistive heating.

Free form fabrication of articles ("3D printing") may involve heating the fabrication material feedstock to melt it. Controlled cooling may be utilized to ensure that the fabricated structure does not suffer from excessive distortion after the material is put into place. The present disclosure includes a method of applying localized heat using an electrically conductive nozzle and a conductive plate as the electrodes to supply electrical current through electrically conductive filaments during the free form fabrication process. The method may be used for laying down electrically conductive filaments in a fast, accurate and controlled manner with localized heat.

The present disclosure includes a method for fabricating articles out of electrically conductive filaments that generates localized heat through resistive heating of the filament. Another aspect of the present disclosure is a method for manufacturing articles of electrically conductive filament without use of a heating mechanism such as an environmental chamber, heating bed, or other auxiliary heat sources. Another aspect of the present disclosure is a method for fabricating articles that includes a way to cut electrically conductive filaments depending on the level of electrical current (or voltage). The electrically conductive filaments can be cut as needed at a point in very close proximity to where deposition occurs. Another aspect of the present disclosure is a method for fabricating articles wherein the heat is localized at or near the point where filament placement and cutting occur. Distortion of the fabricated part is substantially reduced or avoided altogether because a large heat gradient is not generated during the fabrication process. Yet another aspect of the present disclosure is a method for fabricating articles that is both fast and accurate due, at least in part, to the restriction of heat to the zone that needs to be heated.

The method may include fabricating composite articles by supplying electrical current to an electrically conductive filament. The electrically conductive filament may include a first material that is electrically conductive and a polymer second material. The electrically conductive first material may comprise at least one of a continuous carbon assemblage and a polymer doped with an electrically conductive filler (e.g. carbon) having a concentration in the polymer matrix that is above the electrical percolation threshold. The continuous carbon assemblage may comprise one or more of carbon fiber, carbon nanotube, graphite, activated carbon, and/or graphene. The electrically conductive carbon filler to be used as a polymer dopant may comprise one or more of chopped carbon fiber, carbon nanotubes, graphite, activated carbon, and/or graphene powders. Alternatively, the electrically conductive first material may comprise at least one of a conductive polymer, metal wire, metal alloy, metal/carbon hybrid or combination thereof. The polymer second material may comprise at least one of a thermoplastic polymer and a partially cured thermosetting polymer. The polymer second material may contain thermally and electrically conductive fillers to enhance the heating and printability as well as the properties of the completed part. These fillers may include one or more of dispersed chopped carbon fibers, chopped carbon fiber, carbon nanotubes, graphite, activated carbon, and/or graphene powders. The heated filament is deposited on a substrate in successive layers to adhere the polymer material of the layers together and build up a three dimensional article having strands of the first material embedded in a substantially continuous polymer matrix of the second material.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

DETAILED DESCRIPTION OF THE INVENTION

Figure 1:
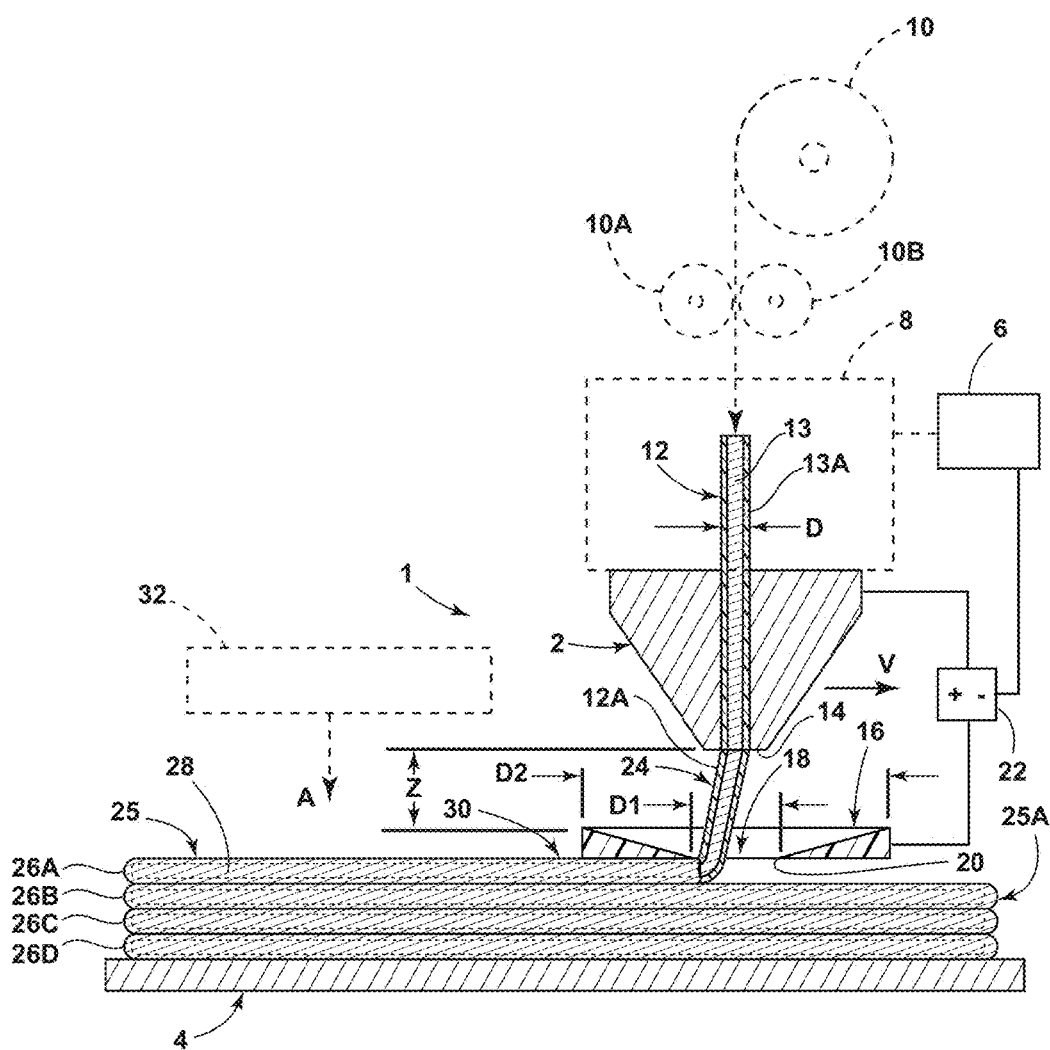
FIG. 1 is a schematic cross-sectional view of a device for free form fabrication of components using localized heating of electrically conductive filaments.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The ability to fabricate multifunctional composite components may be important where tailorability of function is achieved by strategic placement of materials with unique functionality in locations that may not be accessible by conventional manufacturing techniques. Some examples include embedded conductive paths interspersed in components to act as sensing elements, or as heaters, or to carry electrical current to power electrical components. The processing of these materials typically requires adhesion of filaments to each other, as well as to a substrate. In particular, additive manufacturing processes of electrically conductive and continuous fiber reinforced composites typically require specific placement and cutting technologies for the filaments.

Various methods of heating composites to promote polymer resin or filaments infusion and cure have been reported in the literature. Microwave, infrared, ultrasonic, inductive, resistive heating, and electromechanical and electrothermal heating methods have been reported. Resistive heating and electromechanical and electrothermal heating methods allow for targeted heating to specific zones, potentially minimizing the overall energy requirements for large part fabrication.

With reference to FIG. 1, a free form fabrication device such as 3D printing apparatus 1 includes an electrically conductive nozzle 2 that is movably disposed above a substrate or plate 4. 3D printing apparatus 1 includes a controller 6 and an electrically-powered actuating system/mechanism 8 that moves the nozzle 2 relative to the substrate 4. 3D printing apparatus 1 also includes a controller 6 and an actuating system/mechanism 8 that move the nozzle 2 relative to the substrate 4 in a known manner. Various computer programs for controlling movement of nozzle 2 to fabricate 3D components utilizing 3D CAD data or the like are known in the art. 3D printing apparatus 1 also includes a filament supply 10 that feeds an electrically conductive filament 12 to head 2. As discussed in more detail below in connection with FIGS. 3 and 4, filament 12 may include one or more strands of conductive material (including but not limited to carbon fiber and carbon nanotube) forming a conductive core 13, and polymer material 13A forming an outer layer. During the fabrication process, filaments 12 are successively layered onto substrate 4 to fabricate a component 25. In FIG. 1, the individual layers 26A-26D are shown as distinct layers. However, it will be understood that the polymer material of adjacent layers flows together and/or joins together to form a substantially continuous polymer matrix 28 in which the fibers of core 13 of filament 12 are embedded.

Nozzle 2 is made of an electrically conductive material (e.g. metal) and forms a first electrode. Nozzle 2 has an outlet opening 14 having a diameter that may be equal to a diameter "D" of the filament 12. Alternatively, opening 14 may be larger or smaller than diameter "D." A plate 16 forms a second electrode. Plate 16 is also made of an electrically conductive material (e.g. metal), and includes a tapered/countersunk hole 18 with a minimum diameter "D1" that is greater than the diameter D of the filament 12, and a larger upper diameter "D2." The hole 18 extends through the thickness of the plate 16 and creates a sharp edge 20 at the bottom of the plate 16.

The nozzle outlet opening 14 and the hole 18 in plate 16 are preferably concentric with the larger diameter D2 of the hole 18 in plate 16 facing the nozzle outlet 14. A power supply 22 provides a current (AC or DC) or voltage between the two electrodes (nozzle 2 and plate 16) and thereby causes an electrical current to flow and heat up the filament 12 in the section 12A between the exit opening 14 of nozzle 2 and the plate 16 to a desired temperature. The current provided by power supply 22 may range from a few micro amperes to a few hundred amperes as required to provide proper/required heating of filament 12. Power supply 22 may be operably connected to controller 6, and controller 6 may be configured to adjust the current (or voltage) of power supply 22 during the fabrication process. A vertical distance "Z" between the nozzle 2 and the plate 16 is also preferably adjustable upon actuation of mechanism 8 by controller 6.

To perform the filament placement operation, the filament 12 is first anchored by positioning a portion of filament 8 between plate 16 and substrate 4. Plate 16 and substrate 4 are then moved together to apply a force on filament 8 and clamp an end portion of filament 8 between plate 16 and substrate 4. Anchoring of filament 12 can be conducted with or without resistive heating. Next, the vertical distance Z between the nozzle 2 and plate 16 is adjusted so that nozzle 2 and plate 16 are not touching each other (or any other surface) to thereby avoid creating a short in the circuit. The filament 12 is then pulled taut by a tensioning mechanism (e.g. clamps/rollers 10A and 10B) that is a standard component of known 3D printing devices. Tensioning filament 12 causes secure electrical contact to be made between the filament 12 and the nozzle 2 and between the filament 12 and edge 20 of plate 16. Greater tension on the filament 12 typically provides a better electrical connection between filament 12 and nozzle 2 and plate 16, thereby reducing the overall resistance of the circuit and providing for faster heating of filament 12. Filament 12 may have a conductive core 13A. In general, heating of filament 12 causes coating 13A to at least partially melt such that nozzle 2 and plate 16 contact core 13 to thereby transmit electrical current through core 13. Also, core 13 may comprise one or more strands of conductive material that are at least partially exposed at an outer surface of filament 12 prior to melting of polymer material 13A such that the conductive material of core 13 contacts nozzle 2 and plate 16 to complete the current such that electrical current flows through filament 12.

The electrical current applied to the filament 12 creates a heated zone or portion 24 of filament 12 between the nozzle 2 and the plate 16. To effect the fabrication of articles (e.g. article 25) the temperature of the heated portion 24 should be high enough to cause softening or partial melting of the polymer material 13A of conductive filament 12 and/or a coating surrounding filament 12. The partially molten segment 24 of the filament 12 is then laid onto substrate 4 or onto an already deposited/solidified portion 25A of article 25. A filament feed mechanism (e.g. pinch wheels 10A and 10B) feeds filament 12 at a rate that is substantially equal to a nozzle speed "V" across the substrate 4 to ensure that the electrical connection between the electrodes (nozzle 2 and plate 16) and the filament 12 remains optimal. A rapidly cooling and tacky molten zone 30 enabled by the localized heating of filament 12 allows this placement of the material. A compaction force to push the partially molten zone into the substrate or existing portion 25A of article 25 parts may be applied as required. For example, a powered press plate 32 may be brought into contact with molten zone 30 to press the molten or partially molten material of zone 30 into existing (solidified) portion 25A of article 25. The process described above is repeated to build up layers 26A, 26B, 26C, etc. as required to create a finished structure/article 25.

Figure 2A:
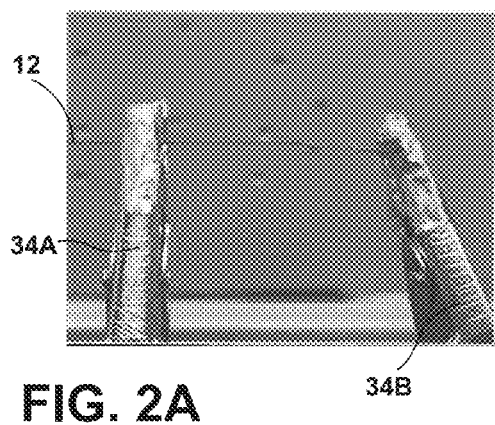
FIGS. 2A-2F are photo images of polymer coated CNT yarn filaments and IR thermographs at various applied voltages.
Figure 2B:
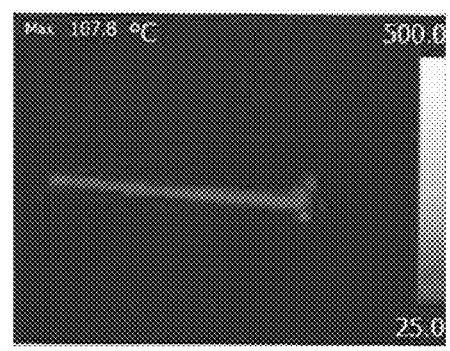
Figure 2C:
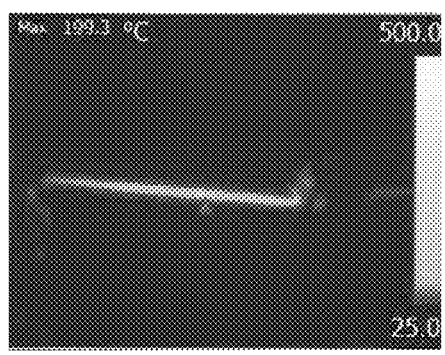
Figure 2D:
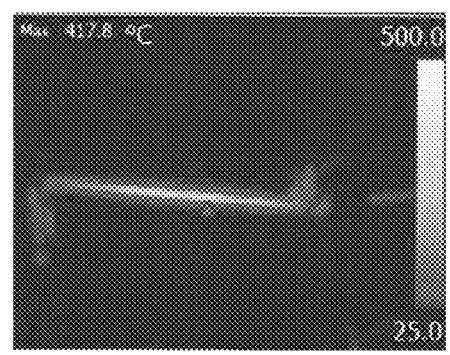
Figure 2E:
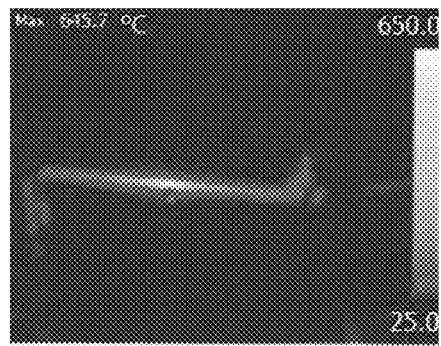
Figure 2F:
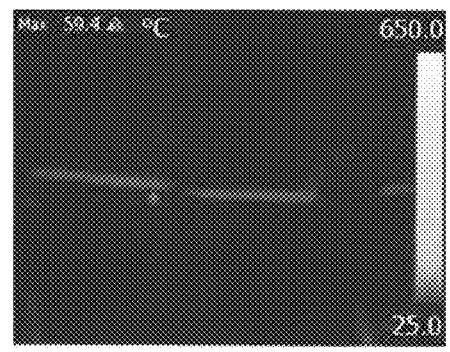

Infrared (IR) images of test samples of filaments 12 (FIG. 2A) are shown in FIGS. 2B-2F. The IR images show temperature profiles of a polymer coated carbon nanotube (CNT) yarn filament 12 during testing in which the electrically conductive CNT filament was heated by applying an electrical current that caused partial melting and fusing of the polymer coating and eventually cutting the filament 12. In FIG. 2A, electrical clips 34A and 34B are applied to a filament 12, FIGS. 2B-2F are IR thermographs showing the temperatures of the test filament 12. In FIG. 2B, the maximum temperature of fiber 12 is 107.8° C. In FIG. 2C, the maximum temperature of fiber 12 is 199.3° C. In FIG. 2D the maximum temperature of test fiber 12 is 417.8° C. In FIG. 2E, the maximum temperature of test filament 12 is 645.7° C. In FIG. 2F, the maximum temperature of test filament 12 is 59.4° C. after filament failure. The IR thermographs of FIGS. 2A-2F demonstrate that passing electrical current through a filament 12 results in significant heating of the filament 12. The temperatures attainable are high enough to enable bonding (typically ranging between glass transition temperature and inciting temperature) or cure of state-of-the-art high performance/engineering thermoplastics or thermosetting resins.

Filament 12 may comprise a CNT core 13 that is coated by a polymer material 13A as discussed above. Alternatively, electrically conductive filament 12 may comprise a conductive core 13 that is coated by a partially cured (B-stage) thermosetting resin. If thermosetting resin is utilized for the polymer, the application of electrical current causes resistive heating of the filament 12, and the heating causes final curing of the thermosetting resin. Localized heating permits the material to be laid down so as to enable crosslinking of the thermosetting resin between layers 26A, 26B, etc, and fabrication of an article 25 having a substantially continuous polymer matrix 28.

Figure 3:
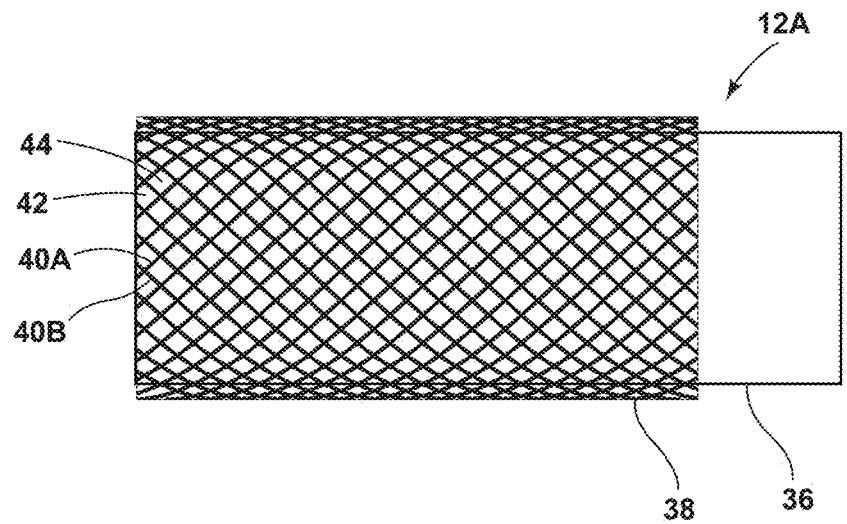
FIG. 3 shows a filament having a polymer core and conductive outer mesh.

With reference to FIG. 3, a filament 12A may be utilized in a process according to the present disclosure. Filament 12A includes a polymer core 36 and conductive reinforcement fiber 38 disposed around the polymer core 36. The conductive reinforcement fiber 38 may comprise carbon nanotube yarn or other conductive material. As shown in FIG. 3, the outer conductive reinforcement 38 may comprise a mesh including a plurality of first strands 40A that spiral around polymer 36 in a first direction, and a plurality of second strands 40B that spiral around polymer 36 in a second direction to thereby form a grid 42 defining a plurality of generally square or rectangular openings 44. The strands 40A and/or 40B may comprise carbon fibers, carbon nanotube yarn, or other suitable conductive material. The conductive material 38 provides for electrical conduction in a free form fabrication process according to the present disclosure.

Figure 4:
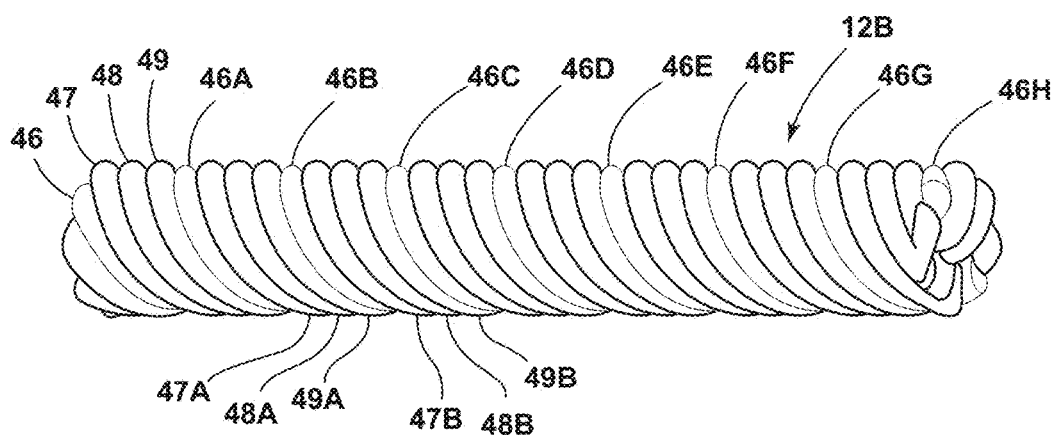
FIG. 4 is an isometric view of a filament including conductive reinforcement fibers and polymer fibers.

With further reference to FIG. 4, a filament 12B according to another aspect of the present disclosure includes at least one polymer strand 46 and one or more conductive reinforcing strands 47, 48, 49. The reinforcing strands 47, 48, 49 may comprise carbon fibers, carbon nanotube yarn, or other suitable conductive material. The individual loops 46A-46H of polymer strand 46 are disposed between the individual loops 47A, 48A, 49A, etc. of the reinforcing strands 47, 48, 49.

It will be understood that the number and configuration of the conductive and noon-conductive strands may vary and the present disclosure is not limited to any specific filament configuration. In general, virtually any filament that includes conductive material may be utilized in connection with the present disclosure. The filament preferably includes conductive material on an outside of the filament as shown in FIGS. 3 and 4 to ensure that the filament conducts electricity to heat the filament during additive fabrication of components.

Figure 5:
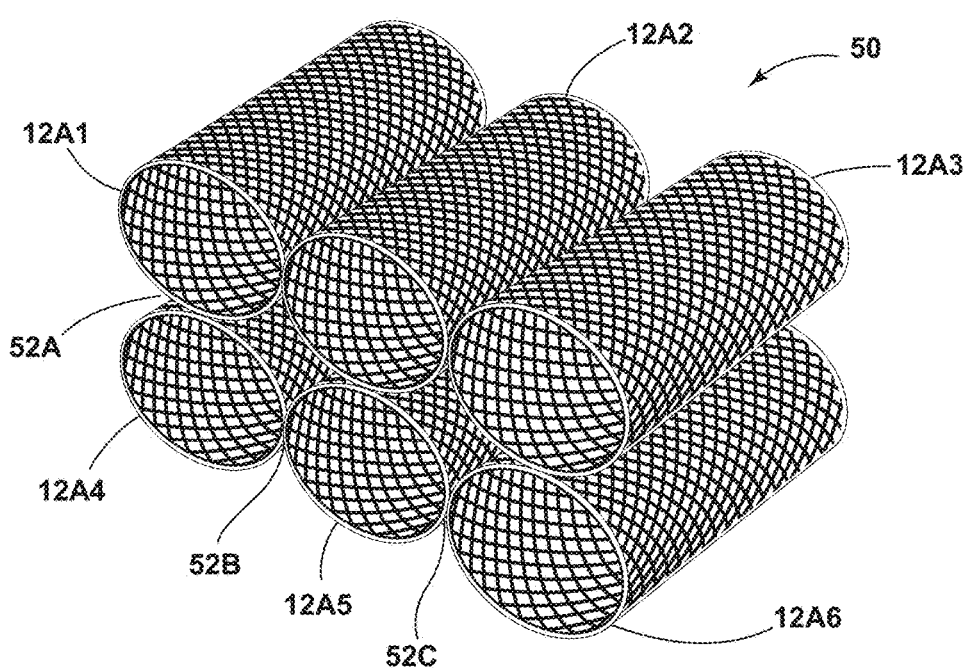
FIG. 5 is an isometric view of a printed article fabricated utilizing the filament of FIG. 3.

With reference to FIG. 5, a printed article or component 50 may be fabricated utilizing a plurality of filaments 12A (FIG. 3). In FIG. 5, the individual filaments 12A are designated 12A1-12A6. In FIG. 5, vertically adjacent filaments (e.g. 12A1 and 12A4) are vertically aligned. However, it will be understood that the individual filaments 12A may be offset to form a "close packed" configuration. Also, it will be understood that FIG. 5 is partially schematic in nature, and shows nominal positioning and shapes of the filaments 12A1-12A6. During the fabrication process, the polymer material 36 (not shown in FIG. 5) melts and flows through the reinforcing material 38 to fill the spaces 52A, 52B, 52C, etc. shown in FIG. 5 to form a substantially continuous polymer matrix. Also, during fabrication the reinforcing mesh 38 may deform somewhat into a shape that is at least somewhat non-cylindrical.

Figure 6:
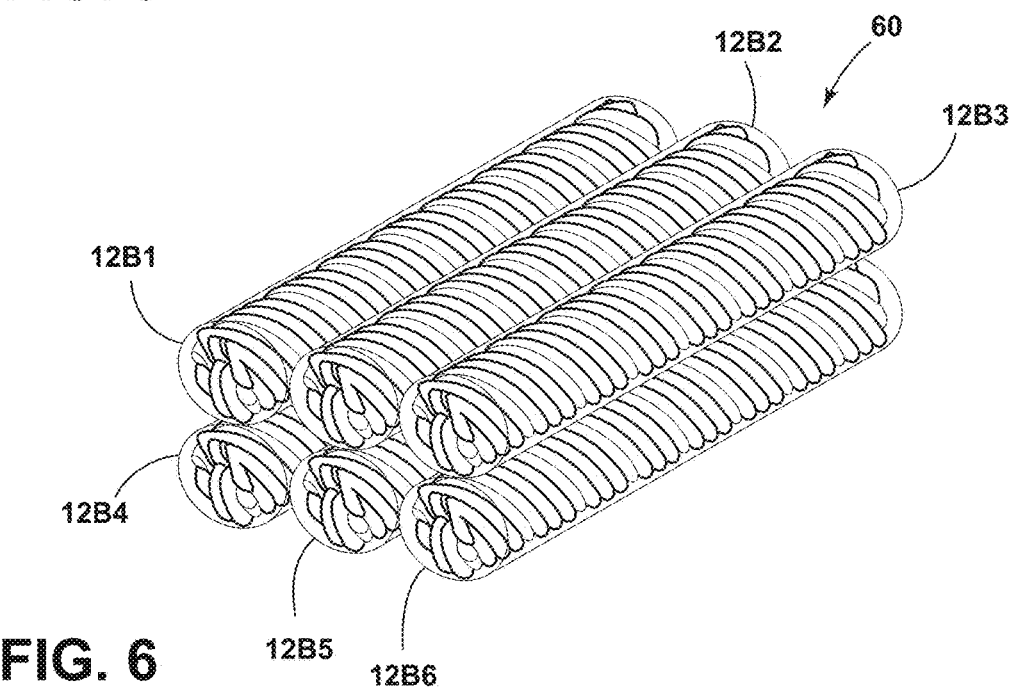
FIG. 6 is an isometric view of a printed article fabricated from the filament of FIG. 4.

With reference to FIG. 6, a printed article or component 60 may be fabricated utilizing a plurality of filaments 12B (FIG. 4). FIG. 6 is partially schematic, and shows nominal shape and positioning of the individual filaments 12B1-12B6. It will be understood that during the free form fabrication process the polymer strands 47, 48, 49 (FIG. 4) at least partially melt and form a substantially continuous polymer matrix that is preferably free of voids.

Figure 6A:
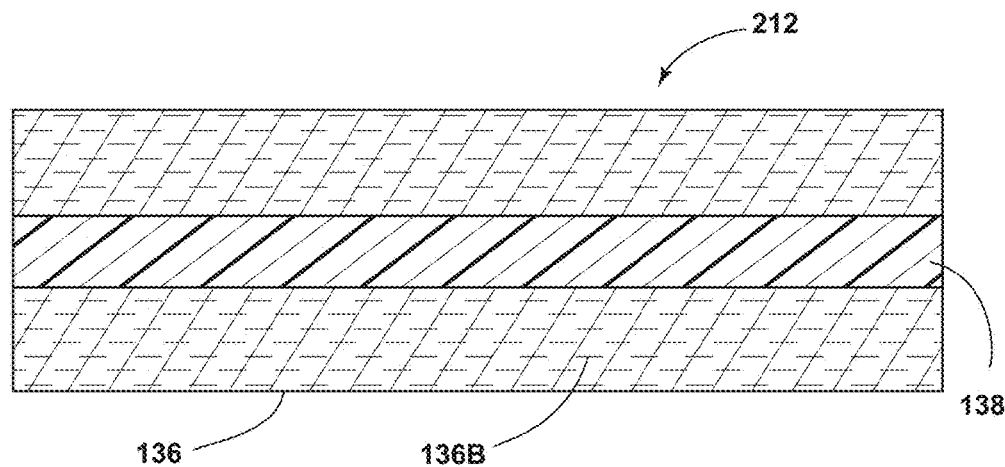
FIG. 6A is a schematic cross-sectional view of a filament having a conductive core and a polymer matrix that is doped with electrically conductive filler material.

With reference to FIG. 6A, an engineered filament 212 comprises a polymer matrix material 136 that is doped with a dispersed electrically conductive filler 136B (e.g. carbon or metal particles, flakes, etc.) surrounding a continuous conductive core 138. Core 138 may comprise carbon fiber CNT yarn, or other suitable electrically conductive material. The loading (e.g. weight %) of the dispersed electrically conductive filler 136B is preferably above the electrical percolation threshold in order to enable current flow. Electrical current passing through the filament of FIG. 6A causes resistive heating of both the conductive core 138 and the percolating network of dispersed electrically conductive filler 136B. During fabrication, the heat causes fusion of the polymer matrix material 136 of adjacent filaments 212 to form a part. The polymer matrix material 136 may fuse to form a substantially continuous matrix in the part. The dispersed electrically conductive filler 136B may comprise a thermally conductive material that enhances heat transport between the resistively heated core 138 and the polymer matrix 136. If a thermally conductive dispersed filler material 136 is used, the filler loaded matrix material serves to ensure that there is always an electrical bridge between the printer electrodes and the conductive core. A thermally conductive filler material 136 also provides for additional resistive heating of the matrix polymer as well as enhanced heat transport.

Figure 6B:
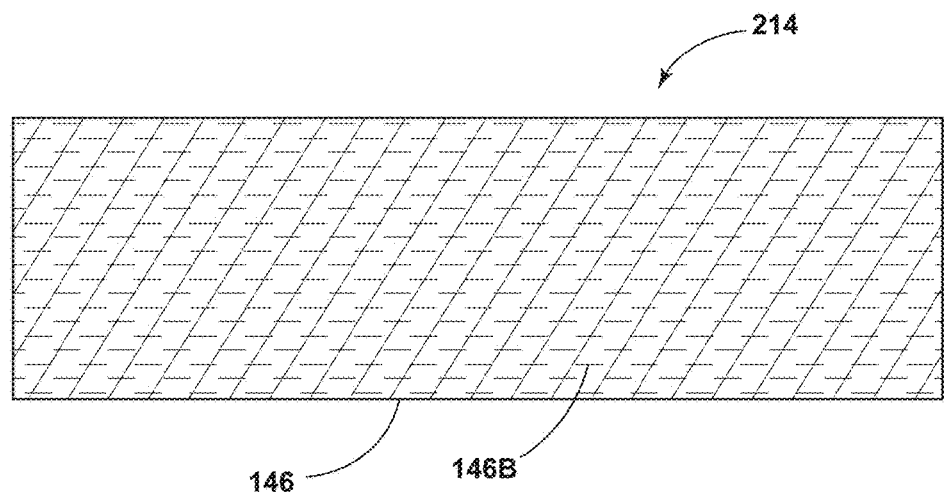
FIG. 6B is a schematic cross-sectional view of a filament comprising a polymer matrix that is doped with electrically conductive filler material.

With further reference to FIG. 6B, an engineered filament 214 according to another aspect of the present disclosure comprises a polymer matrix 146 that is doped with an electrically conductive filler 146B whose loading (e.g. weight %) is above the electrical percolation threshold in order to enable electrical current flow through polymer matrix 146. Electrical current passing through the filament 214 of FIG. 6B causes resistive heating of the percolating network of dispersed electrically conductive filler 146B. During fabrication of parts, the heat causes fusion of the polymer matrix material 146 of adjacent filaments 214 to form the part. The dispersed electrically conductive filler 146B may comprise a thermally conductive material that enhances heat transport to the polymer matrix material 146. The presence of the percolating network of electrically conductive filler 146B throughout the filament also ensures that there is good electrical contact between the printer electrodes and the filament 214. In other embodiments of the invention, an intrinsically electrically conductive polymer matrix material may be used in place of the finer loaded polymer matrix described above. However, an intrinsically electrically conductive polymer matrix material may also be doped with electrically conductive filler.

Figure 7:
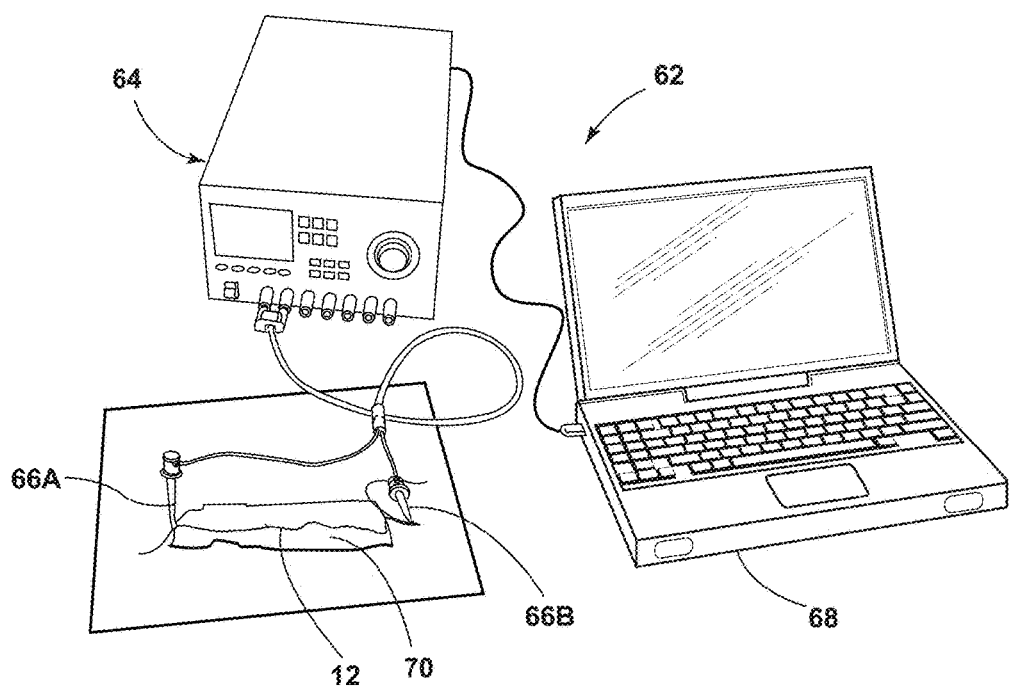
FIG. 7 is a perspective view of a test set-up utilized for the preparation of engineered filaments such as those shown in FIG. 4.

With further reference to FIG. 7, a test setup 62 was utilized for the preparation of an engineered filament 12. In the test, a DC power source 64 was operably connected to carbon nanotube (CNT) yarn wound helically around a polyetherimide (PEI) filament by electrodes 66A and 66B (see also FIG. 8), and a controller/laptop computer 68 was operably connected to the DC power source 64. The filament preparation material was positioned on ceramic material 70, and a voltage was applied to electrodes 66A and 66B, thereby causing DC electrical current to flow through the CNT and fuse it to the PEI to form filament 12 (see also FIG. 11).

Figure 8:
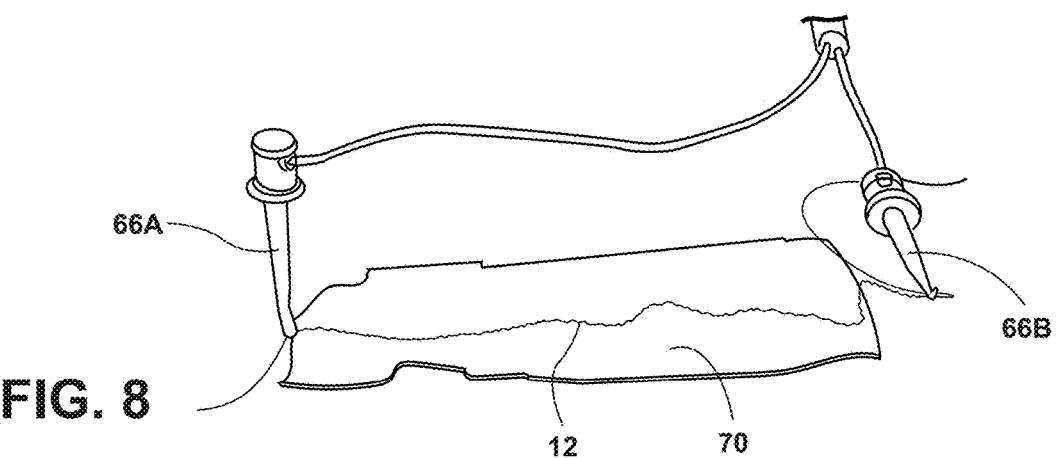
FIG. 8 is a fragmentary enlarged view of a portion of the test set-up of FIG. 7.
Figure 9:
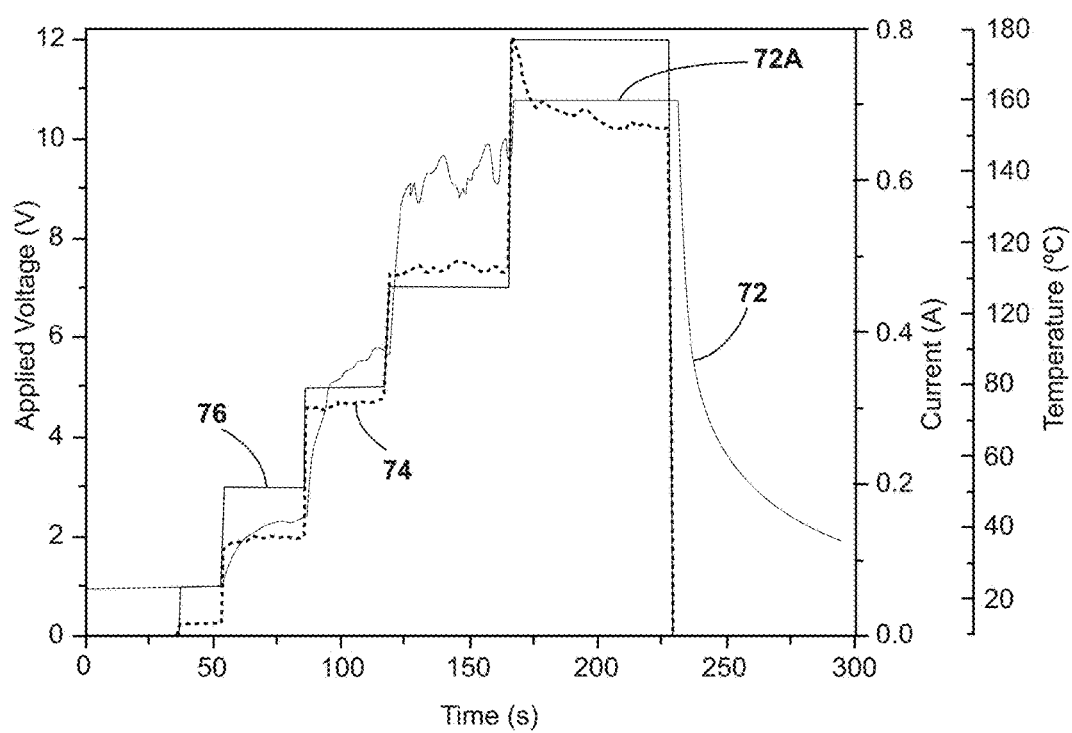
FIG. 9 is a graph showing voltage-current-temperature profiles for engineered filament preparation showing data from the test set-up of FIGS. 7 and 8.
Figure 10A:
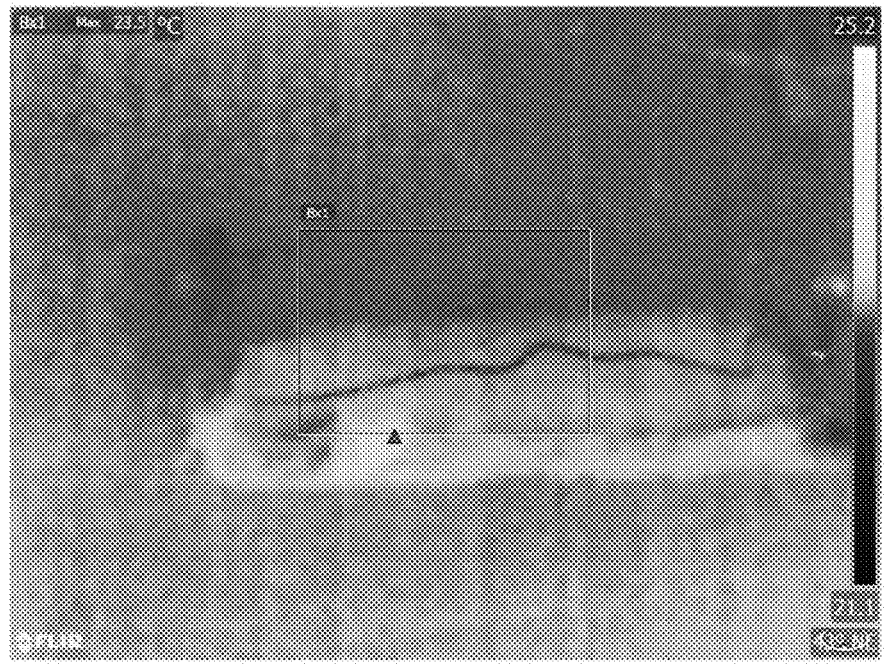
FIGS. 10A-10F are images (IR thermographs) corresponding to the steps in the engineered filament processing voltage-current-temperature profiles of FIG. 9.
Figure 10B:
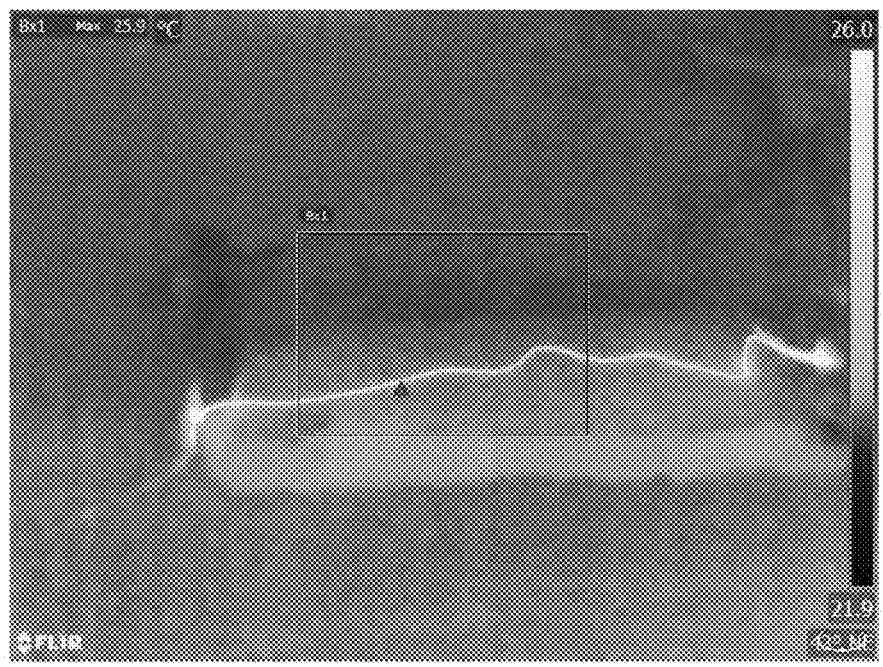
Figure 10C:
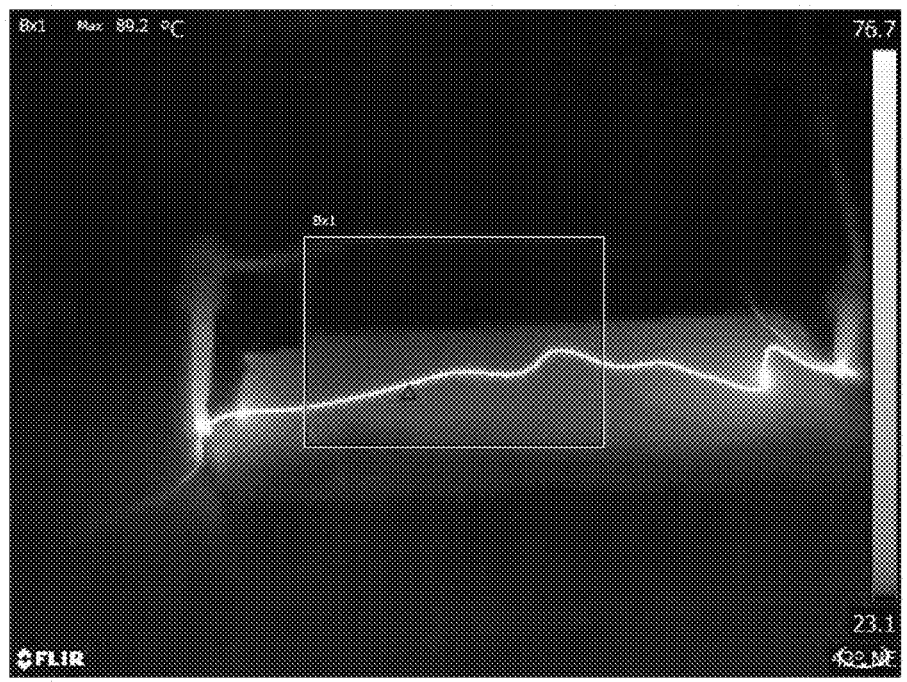
Figure 10D:
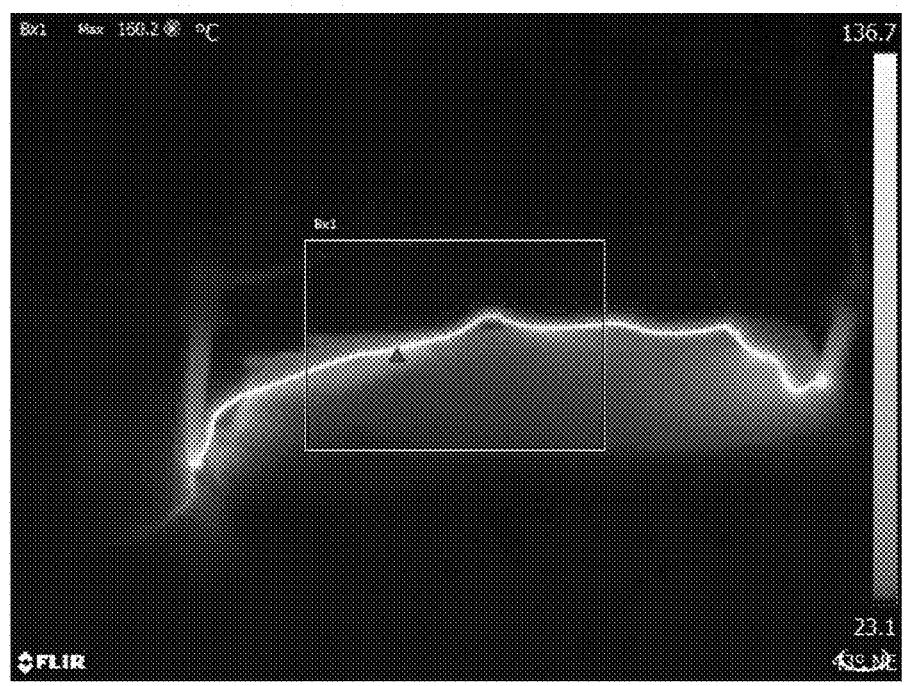
Figure 10E:
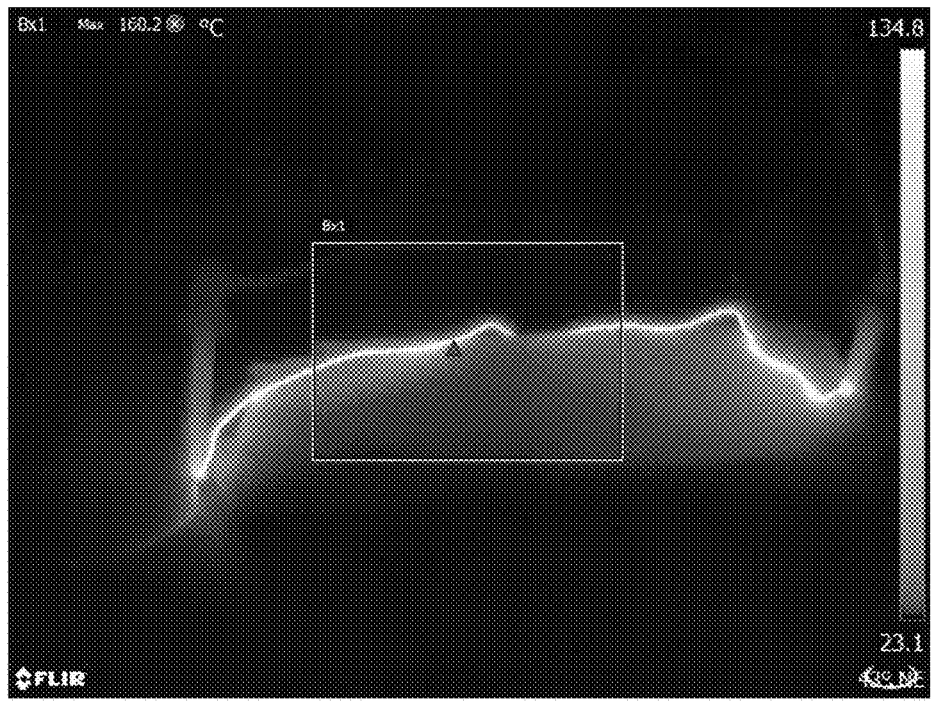
Figure 10F:
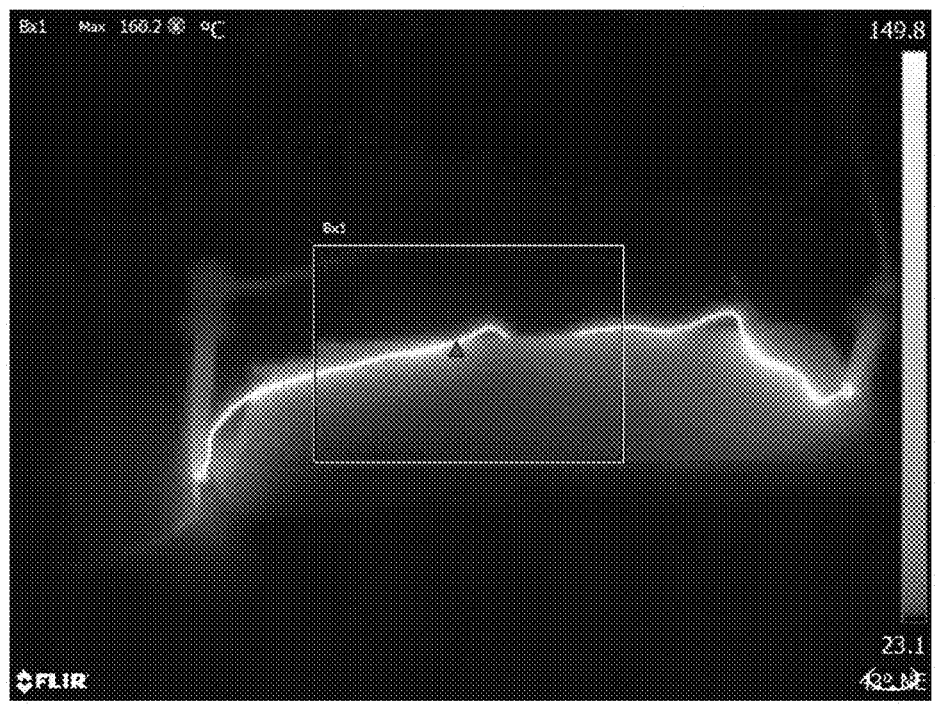

FIG. 9 is a graph showing test results from the setup 62 of FIGS. 7 and 8. Line 72 represents measured temperature, dashed line 74 represents the electrical current, and the stepped line 76 represents the applied voltage. The horizontal line segment 72A is due to detector saturation, and the temperature results for this applied voltage (12V) shown in the graph of FIG. 9 is therefore not believed to be accurate.

FIGS. 10A-10F are IR thermographs showing temperature at various stages during the filament preparation process, and the times and voltages correspond to the same in FIG. 9. The thermographs are snapshots taken at T=0, 1, 238, 257, 305 and 350 s. The test shows that the temperature during the filament preparation process can be carefully controlled (by control of the applied current) to enable the partial melting of the polymer and fusing to the conductive fiber that allows the resulting composite filament to be used in the additive manufacturing process.

Figure 11:
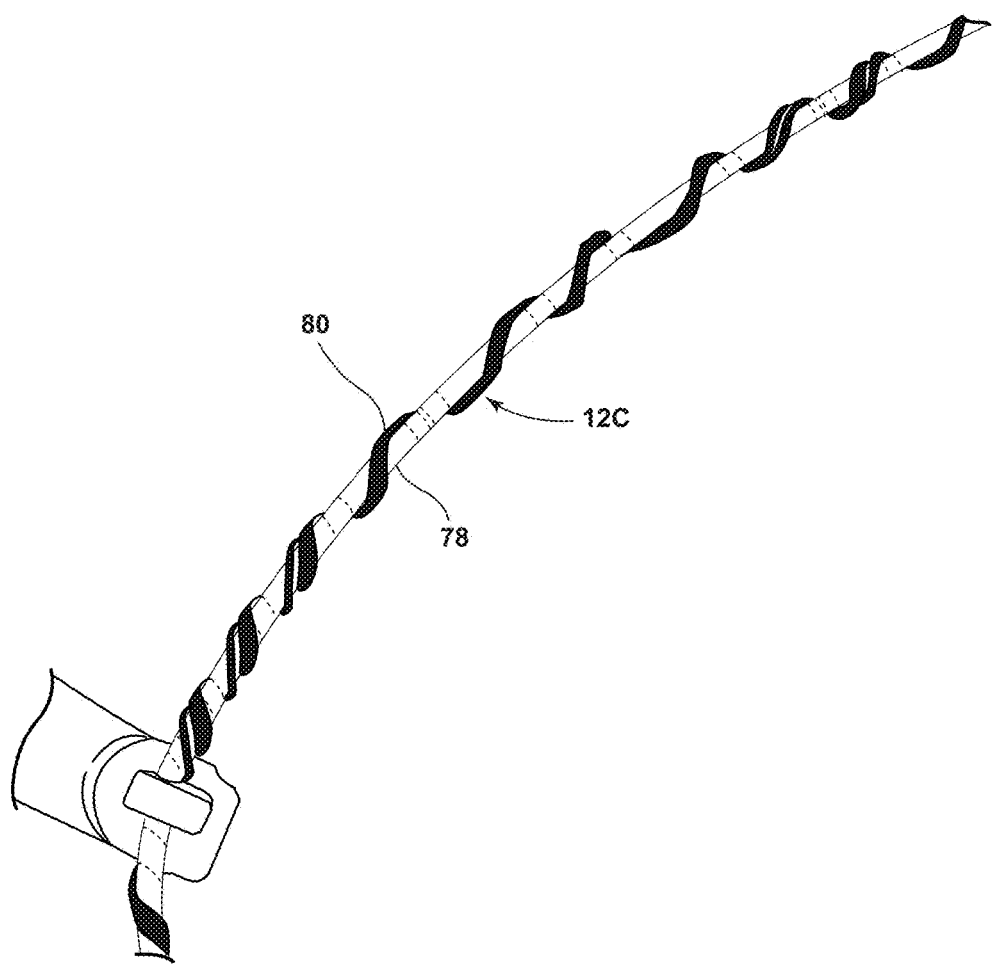
FIG. 11 is a partially fragmentary perspective view of a portion of an engineered CNT/PEI resistive heating printer filament prepared utilizing the setup of FIG. 7.
Figure 12:
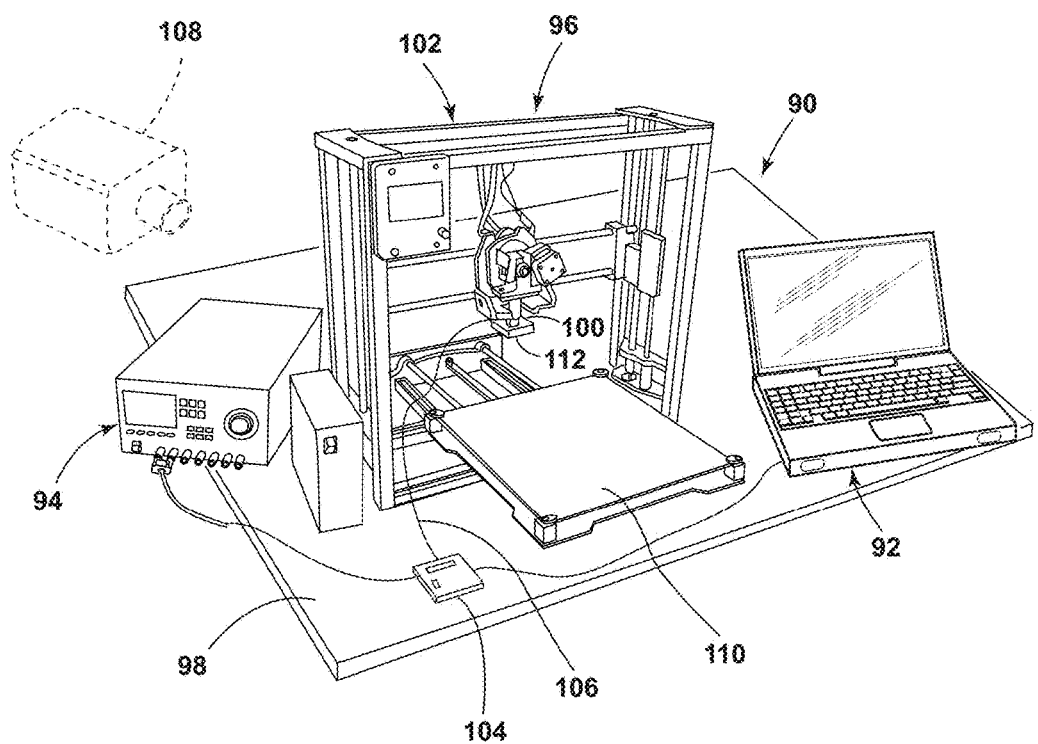
FIG. 12 is a partially fragmentary perspective view of a test set-up of a resistive heating 3D printer.

With reference to FIG. 11, an engineered carbon nanotube (CNT) and polyetherimide (PEI) filament 12C according to another aspect of the present disclosure includes a polymer core strand 78 and a continuous conductive strand 80. Strand 80 comprises CNT yarn that is spiraled around the PEI core 78. The CNT strand 80 provides for conduction of electrical current when the filament 12C is utilized in an additive manufacturing process according to the present disclosure.

A test setup 90 (FIGS. 12-16) was utilized to further test a 3D additive process according to the present disclosure. Test setup 90 includes a controller such as a laptop computer 92 and a DC power supply 94. A 3D printer 96 comprises a modified open source 3D printer and includes a head assembly 100 that is movable via a known support/actuation assembly 102. A power supply control unit 104 controls the electrical power provided by power source 94. The electrical power is supplied to the head assembly 1 by electrical lines 106. An IR camera 108 may be utilized to determine the temperature of the components during the fabrication process. The 3D printer 96 also includes a platform or support 110 upon which the filaments are deposited by the head assembly 100. The head assembly 100 includes a heating foot 112 that operates in a manner that is somewhat similar to the plate 16 (FIG. 1) described in more detail above.

Figure 13:
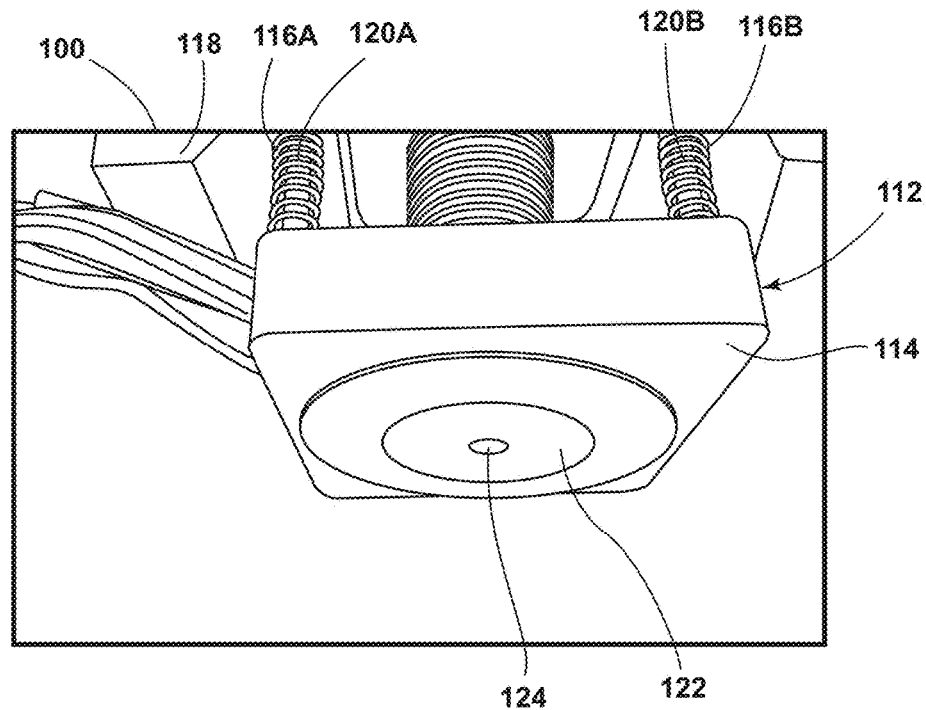
FIG. 13 is a bottom perspective view of a heating foot for the resistive heating printer of FIG. 12.
Figure 14:
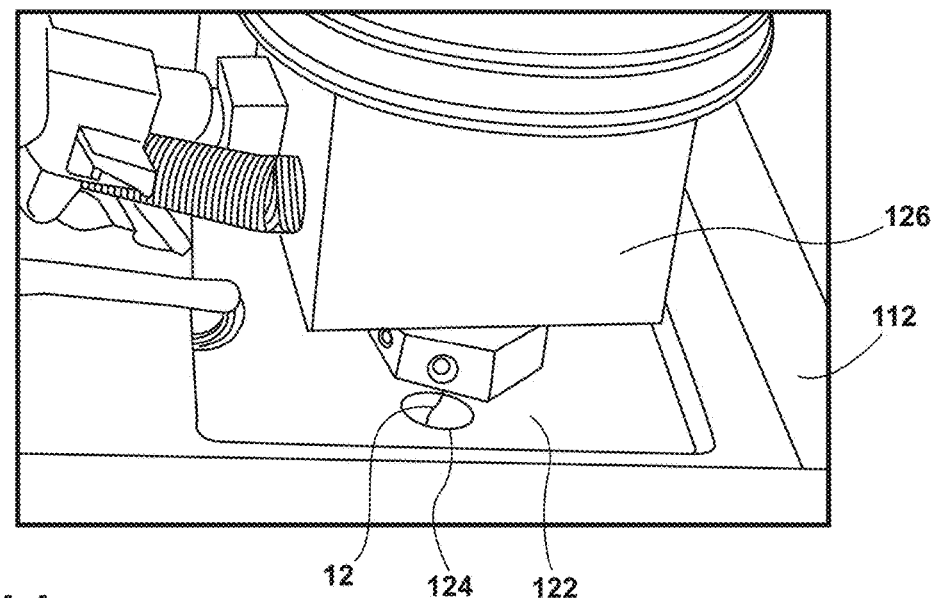
FIG. 14 is a top perspective view of a heating foot for the resistive heating printer of FIG. 13.
Figure 15:
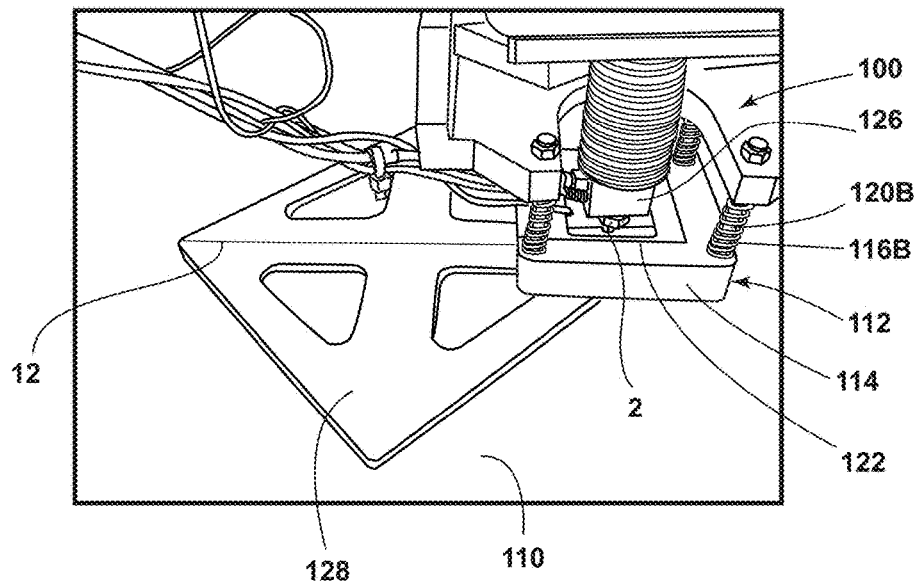
FIG. 15 is a partially fragmentary perspective view showing a lower portion of the 3D printer of FIG. 13.

With further reference to FIGS. 13 and 15, heating foot 112 includes an outer support 114 that may be formed from a polymer or other suitable material. The heating foot 112 is movably connected to structure 118 of head assembly 100 by one or more springs 116A, 1160 and one or more shafts 120A, 120B. Shafts 120A, 120B, etc. linearly guide heated foot 112 relative to structure 118. A conductive metal foot component 122 includes an opening 124. Foot component 122 is operably connected to a first pole or terminal of electrical power supply 94 to form a first electrode. In use, filament is fed through opening 124 such that the filament contacts conductive metal foot component 122 of heating foot 112. Heating foot 112 also includes a second electrode 126 (FIG. 14) that is connected to a second pole or terminal of an electrical power supply. Second electrode 126 is positioned above the foot component 122. In use, the filament 12 contacts the electrodes 122 and 126 to heat the filament.

Figure 16:
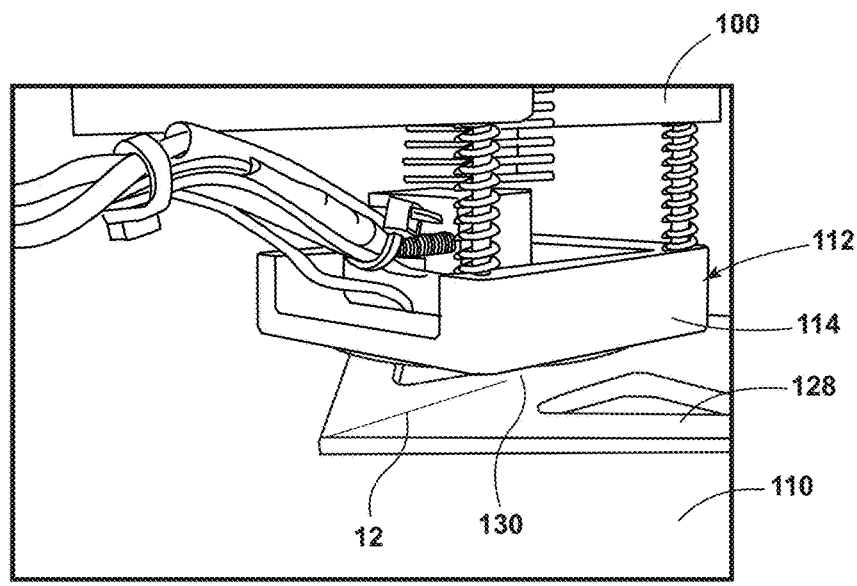
FIG. 16 is a partially fragmentary perspective view showing a lower portion of the 3D printer of FIG. 12.

With further reference to FIGS. 15 and 16, a suitable substrate such as polymer part 128 may be positioned on the platform 110. During the test, a continuous CNT yarn filament 12 (ABS/CNT yarn) was placed on the substrate 128 in a desired location. A voltage (or current) was applied to the filament 12 by electrodes 122 and 126. The nozzle 2 moves relative to the plate 110 and substrate 128 to print continuous CNT yarn filament under controlled voltage (or current). As shown in FIG. 16, filament 12 may be cut to form a gap 130 between the filament segments. The filament 12 can be cut by applying a cutting voltage to the filament 12 utilizing electrodes 122 and 126, thereby melting and/or ablating a portion of the filament 12. In the example shown in FIG. 16, the cutting voltage is 25V.

The process and devices described herein provide a unique way to build continuously reinforced components using a simple and energy efficient heating process. In particular, the design and fabrication of a filament is specially engineered to enable free form fabrication using Joule heating, (i.e. a process in which there is a continuous conductivity path). The electrodes are specifically configured to utilize the engineered filament to provide continuous flow of electrical current through a portion of the filament disposed between the first and second electrodes.

It is to be understood that variations and modifications can be made on the aforementioned structure without departing from the concepts of the present invention, and further it is to be understood that such concepts are intended to be covered by the following claims unless these claims by their language expressly state otherwise.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A method of fabricating composite articles, comprising:
providing an electrically conductive filament comprising a first material that is electrically conductive and a polymer second material; and wherein the polymer second material comprises at least one of a thermoplastic polymer and a partially cured thermosetting polymer;
supplying electrical current to the electrically conductive filament to heat the filament wherein the electrical current ranges from about 1 µA to about 1 MA,
depositing the heated filament on a substrate in successive layers to adhere the polymer material of the layers together and build up a three dimensional article having strands of the first material embedded in a substantially continuous polymer matrix of the second material.

2. The method of claim 1, including:
providing first material comprising carbon.

3. The method of claim 2, wherein:
the filament is provided in a form comprising carbon selected from a group consisting of carbon fiber, carbon nanotube, graphite, activated carbon powder, and graphene.

4. The method of claim 1, wherein:
the filament is provided in a form comprising a polymer matrix and conductive filler, wherein a loading of the conductive filler is at or above an electrical percolation threshold, and wherein the conductive filler is selected from the group consisting of chopped carbon fiber, carbon nanotube, graphite, activated carbon powder, and graphene.

5. The method of claim 1, wherein:
the second material comprises a thermoplastic polymer that forms a molten portion on a partially-formed article, and including:
allowing the molten portion to solidify.

6. The method of claim 1, wherein;
the polymer second material comprises a partially cured thermosetting polymer that cures after heating and including:
adhering the polymer second material to previously-deposited thermosetting polymer material.

7. The method of claim 1, wherein:
the filament is provided in a form comprising a plurality of electrically conductive filaments.

8. The method of claim 1, including:
providing filament comprising a polymer matrix and conductive filler, wherein the loading of the conductive filler is at or above the electrical percolation threshold.

9. The method of claim 8, wherein:
the conductive filler is provided in a form comprising at least one of a chopped carbon fiber, carbon nanotubes, graphite, activated carbon powder, graphene and/or metal particles.

10. The method of claim 1, wherein:
the filament is provided in a form comprising a continuous electrically conductive fiber as the first material and a matrix loaded with dispersed electrically conductive filler as the second material.

11. The method of claim 1, including:
causing at least one of the layers to undergo chemical crosslinking due to electrical current being applied to the filament.

12. The method of claim 1, wherein:
at least one of the layers is provided in a form comprising a partially cured thermosetting resin.

13. The method of claim 1, wherein:
at least one of the layers of the electrically conductive filaments is provided in a form comprising carbon nanotubes, conductive polymer, metal wire, metal alloy, metal/carbon hybrid or a combination thereof.

14. The method of claim 1, including:
providing an electrically conductive nozzle;
providing an electrically conductive guide member;
operably connecting the electrically conductive nozzle and the conductive guide member to opposite poles of an electrical power source;
causing the electrically conductive filament to contact the electrically conductive nozzle and the electrically conductive guide member; and
causing electrical current to flow through the filament and heat the filament.

15. The method of claim 14, wherein:
the electrically conductive guide member includes an opening; and including:
feeding the filament through the opening.

16. A method of printing an article, comprising:
providing data describing a geometry of an article to be printed;
providing electrically conductive filament that is bondable when heated to a bonding temperature electrically coupling the electrically conductive filament to first and second electrodes of a printing device;
causing the printing device to print the article utilizing the data, wherein printing the article includes passing electrical current through the electrically conductive filament to heat the electrically conductive filament wherein the electrical current ranges from about 1 µA to about 1 MA, and depositing the heated filament onto a substrate.

17. The method of claim 16, wherein:
the electrically conductive filament is provided in a form that includes carbon and polymer materials.

18. A method of printing an article, comprising:
passing electrical current through an electrically-conductive filament to heat the electrically-conductive filament wherein the electrical current ranges from about 1 µA to about 1 MA; and
depositing the heated electrically conductive filament onto a substrate.

19. The method of claim 18, including:
providing an electrically conductive filament comprising a carbon material and a polymer material.

\* \* \* \* \*